(12) United States Patent
Xiao et al.

(10) Patent No.: US 12,498,988 B2
(45) Date of Patent: Dec. 16, 2025

(54) MIGRATING STATEFUL WORKLOADS BETWEEN CONTAINER CLUSTERS WITH DIFFERENT STORAGE BACKENDS

(71) Applicant: VMware LLC, Palo Alto, CA (US)

(72) Inventors: Yifeng Xiao, Beijing (CN); Maosheng Ren, Beijing (CN); Yang Yu, Beijing (CN); Jia Zou, Beijing (CN)

(73) Assignee: VMware LLC, Palo Alto, CA (US)

( * ) Notice: Subject to any disclaimer, the term of this patent is extended or adjusted under 35 U.S.C. 154(b) by 1101 days.

(21) Appl. No.: 17/499,059

(22) Filed: Oct. 12, 2021

(65) Prior Publication Data
US 2023/0115261 A1   Apr. 13, 2023

(51) Int. Cl.
*G06F 9/50* (2006.01)
*G06F 9/455* (2018.01)
*G06F 9/54* (2006.01)

(52) U.S. Cl.
CPC ........ *G06F 9/5077* (2013.01); *G06F 9/45558* (2013.01); *G06F 9/5088* (2013.01); *G06F 9/545* (2013.01); *G06F 2009/45587* (2013.01)

(58) Field of Classification Search
CPC .. G06F 9/5077; G06F 9/45558; G06F 9/5088; G06F 9/545; G06F 2009/45587; G06F 2009/4557; G06F 2009/45579
See application file for complete search history.

(56) References Cited

U.S. PATENT DOCUMENTS

| | | | | |
|---|---|---|---|---|
| 10,324,911 B1 * | 6/2019 | Smirnov | ............ | G06F 16/2255 |
| 11,019,023 B1 * | 5/2021 | Hegde | ................ | H04L 67/1053 |
| 11,068,500 B1 * | 7/2021 | Meiri | ...................... | G06F 16/27 |
| 11,929,883 B1 * | 3/2024 | Ghatpande | .............. | H04L 41/40 |
| 2006/0190999 A1 * | 8/2006 | Chen | ....................... | H04L 63/02 |
| | | | | 726/11 |
| 2008/0086616 A1 * | 4/2008 | Asano | .................... | G06F 3/0647 |
| | | | | 711/170 |
| 2008/0162662 A1 * | 7/2008 | Fujita | .................. | G06F 11/1464 |
| | | | | 706/46 |
| 2010/0077169 A1 * | 3/2010 | Pace | ...................... | G06F 16/119 |
| | | | | 711/E12.002 |

(Continued)

*Primary Examiner* — Nicholas P Celani
*Assistant Examiner* — Wuji Chen
(74) *Attorney, Agent, or Firm* — Quarles & Brady LLP

(57) ABSTRACT

Techniques for migrating a stateful workload between a source container cluster and a destination container cluster that have different storage backends are provided. In one set of embodiments, these techniques involve creating and running, at the time of the migration, transfer processes in the source and destination container clusters respectively, where (1) the source-side transfer process mounts the workload's persistent volumes (referred to as source persistent volumes) in the source container cluster, and (2) the destination-side transfer process mounts destination persistent volumes that have been dynamically provisioned in the destination container cluster in accordance with the specifications of the source persistent volumes. Upon being created and run, the source-side and destination-side transfer processes can work in concert to securely copy the data in the source persistent volumes to their corresponding destination persistent volumes, thereby transferring that data between the storage backends of the source and destination container clusters.

9 Claims, 6 Drawing Sheets

(56) References Cited

U.S. PATENT DOCUMENTS

| | | | | |
|---|---|---|---|---|
| 2010/0211949 A1* | 8/2010 | Nakajima | ........... | H04L 67/1097 |
| | | | | 718/100 |
| 2010/0287257 A1* | 11/2010 | Siozawa | ............. | H04L 67/1097 |
| | | | | 709/217 |
| 2012/0290750 A1* | 11/2012 | Kawaguchi | ......... | G06F 11/2007 |
| | | | | 710/74 |
| 2015/0281500 A1* | 10/2015 | Mori | ................... | H04N 1/00928 |
| | | | | 358/1.15 |
| 2016/0259836 A1* | 9/2016 | Heathorn | .............. | G06F 16/639 |
| 2017/0070572 A1* | 3/2017 | Anan | ..................... | G06F 16/951 |
| 2017/0366606 A1* | 12/2017 | Ben-Shaul | .............. | G06F 3/061 |
| 2017/0371696 A1* | 12/2017 | Prziborowski | ...... | G06F 9/45558 |
| 2018/0213036 A1* | 7/2018 | Vasetsky | ............... | H04L 41/082 |
| 2020/0034077 A1* | 1/2020 | Haravu | .................... | G06F 3/067 |
| 2020/0241882 A1* | 7/2020 | Suzuki | ................ | G06F 11/3466 |
| 2021/0089495 A1* | 3/2021 | Lemke | .................. | G06F 16/183 |
| 2022/0092024 A1* | 3/2022 | Kavaipatti Anantharamakrishnan | .................. | G06F 16/182 |
| 2022/0318050 A1* | 10/2022 | Gokam | ................. | G06F 9/4875 |
| 2022/0407907 A1* | 12/2022 | Cheng | .................... | H04L 67/02 |
| 2023/0259520 A1* | 8/2023 | Failer | .................... | G06F 16/254 |
| | | | | 707/602 |
| 2023/0403180 A1* | 12/2023 | Zheng | .................. | H04L 45/245 |
| 2024/0046318 A1* | 2/2024 | Muriqi | ............... | G06Q 30/0273 |
| 2024/0211276 A1* | 6/2024 | Vohra | .................. | G06F 9/45558 |
| 2024/0256395 A1* | 8/2024 | Gupta | ................ | G06F 11/1466 |

* cited by examiner

MIGRATING STATEFUL WORKLOADS BETWEEN CONTAINER CLUSTERS WITH DIFFERENT STORAGE BACKENDS

BACKGROUND

Unless otherwise indicated, the subject matter described in this section is not prior art to the claims of the present application and is not admitted as being prior art by inclusion in this section.

A container orchestration platform orchestrates the deployment, scheduling, and scaling of containerized workloads (referred to herein as simply "workloads"), which are software applications whose program code and dependencies are packaged into a standard format, known as a container image, that can be uniformly run in different computing environments. A container cluster is a group of physical or virtual machines on which an instance of a container orchestration platform and the workloads it orchestrates are placed and run. An example of a container orchestration platform is Kubernetes and an example of a container cluster is a Kubernetes cluster.

For various reasons, a user running a workload on a first (i.e., source) container cluster may wish to migrate that workload to a second (i.e., destination) container cluster. For example, the destination container cluster may implement a newer version of the container orchestration platform that the user would like to upgrade to. With existing tools, this migration can be carried out via a backup-and-restore approach that involves backing up the workload's state and configuration information (defined in the form of entities known as objects) from the source container cluster to an intermediary repository and restoring that information from the intermediary repository to the destination container cluster.

However, this approach suffers from several drawbacks, particularly in scenarios where the workload to be migrated is stateful, which means that the workload reads/writes persistent data to/from one or more "persistent volume" objects that map to storage regions/volumes on a storage backend. For example, in order to access the data contents of the workload's persistent volumes and copy those contents to/from the intermediary repository, existing backup-and-restore tools generally run as long-lived, privileged processes in the source and destination container clusters. This raises security concerns because such processes can be compromised by malicious actors to, e.g., mount a denial-of-service attack or leak confidential/sensitive data.

Further, if the workload's persistent volumes are large, the process of copying their data contents to the intermediary repository and again to the destination container cluster can take a significant amount of time (resulting in extended downtime for the workload) and the cost of provisioning the intermediary repository can be high due to the need for the repository to have sufficient storage space to hold the backed-up data. The former issue can be mitigated to an extent by allowing the workload to continue accepting requests at the source container cluster while the migration is in progress, but this can lead to inconsistencies between the states of the source and destination container clusters at the conclusion of the migration.

Yet further, the use of the intermediary repository as a backup location can become a performance and scalability bottleneck if multiple workload migrations need to be performed in parallel between different pairs of source and destination container clusters.

DETAILED DESCRIPTION

In the following description, for purposes of explanation, numerous examples and details are set forth in order to provide an understanding of various embodiments. It will be evident, however, to one skilled in the art that some embodiments can be practiced without one or more of these details or can be practiced with modifications or equivalents thereof.

1. Overview

Certain embodiments of the present disclosure are directed to techniques for migrating a stateful workload (i.e., a workload that makes use of one or more persistent volumes) between a source container cluster and a destination container cluster that have different storage backends. For example, the source container cluster may be connected to a local storage area network (SAN) and the destination container cluster may be connected to a public cloud storage service such as Amazon's Elastic Block Store (EBS) or Microsoft's Azure Storage.

In one set of embodiments, these techniques involve creating and running, at the time of the migration, persistent volume (PV) transfer processes (or PV transfer "pods" in Kubernetes parlance) in the source and destination container clusters respectively, where (1) the source-side PV transfer process mounts the workload's persistent volumes (referred to as source persistent volumes) in the source container cluster, and (2) the destination-side PV transfer process mounts destination persistent volumes that have been dynamically provisioned in the destination container cluster in accordance with the specifications of the source persistent volumes. For example, if the workload makes use of a source persistent volume $pv_{source}$ that has a capacity of 10 terabytes (TB) and an access mode of "ReadWriteOnce" (RWO), the source-side PV transfer process can mount $pv_{source}$ and the destination-side PV transfer process can mount an identical (or largely similar) destination persistent volume $pv_{dest}$ that has been dynamically provisioned in the destination container cluster with the same capacity of 10 TB and the same access mode of RWO.

Upon being created and run, the source-side and destination-side PV transfer processes can work in concert to securely copy (using, e.g., a data synchronization tool such as Rsync and a secure network protocol such as Secure Shell (SSH)) the data in the source persistent volumes to their corresponding destination persistent volumes, thereby transferring that data between the storage backends of the source and destination container clusters without having to use an intermediary repository. In some embodiments, this persistent volume data transfer can be performed via a two-stage approach (with two separate source-side PV transfer processes) that ensures the downtime of the workload does not exceed a user-specified threshold, while at the same time guaranteeing consistency of the migrated data. The foregoing and other aspects and described in further detail below.

2. Operating Environment and High-Level Solution Design

Figure 1:
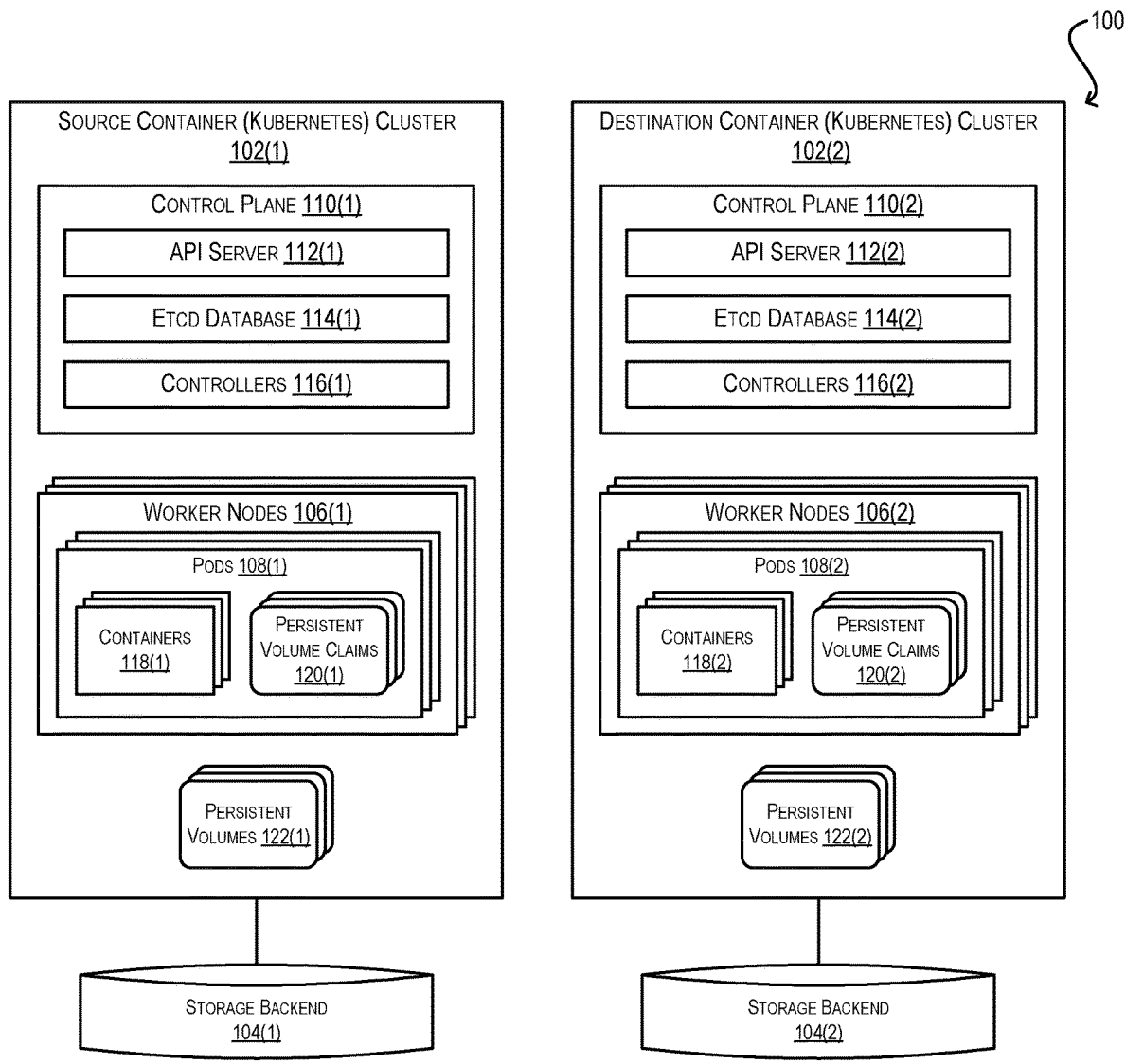
FIG. 1 depicts an example operating environment.

FIG. 1 is a simplified block diagram of an operating environment 100 in which certain embodiments of the present disclosure may be implemented. As shown, operating environment 100 includes a first (i.e., source) container cluster 102(1) that is communicatively coupled with a first storage backend 104(1) and a second (i.e., destination) container cluster 102(2) that is communicatively coupled with a second storage backend 104(2) distinct from first storage backend 104(1). Storage backends 104(1) and 104 (2) are data storage platforms (such as, e.g., a physical or virtual SAN, a private cloud storage service, a public cloud storage service, etc.) that hold persistent data used by stateful workloads running on container clusters 102(1) and 102(2) respectively. In this example, container clusters 102 (1) and 102(2) are specifically Kubernetes clusters and thus implement the Kubernetes container orchestration platform; however, in alternative embodiments container clusters 102 (1) and 102(2) may be any other type of container cluster known in the art, such as a Docker Swarm cluster, a Nomad cluster, a Mesos cluster, or the like.

Each container cluster 102(1)/(2) comprises a set of worker nodes 106(1)/(2) that run the workloads of the cluster. These workloads are organized in the form of pods 108(1)/(2), which are Kubernetes objects that represent workload instances. In addition, each container cluster 102 (1)/(2) comprises a control plane 110(1)/(2) that is configured to manage the cluster's operation. Although a complete description of control plane 110(1)/110(2) is beyond the scope of the present disclosure, this control plane includes, among other things, an application programming interface (API) server 112(1)/(2) that exposes the Kubernetes API to end-users/clients, an "etcd" database 114(1)/(2) that stores the desired state/configuration of container cluster 102(1)/ (2) and its workloads in the form of Kubernetes objects, and a set of controllers 116(1)/(2) that execute control loops for moving the current state of container cluster 102(1)/(2) towards its desired state (as defined via the Kubernetes objects maintained in etcd database 114(1)/(2)).

Each pod 108(1)/(2) running on a worker node 106(1)/(2) includes one or more containers 118(1)/(2), which are runtime instances of container images that hold the program code and dependencies needed to execute the workload embodied by the pod. Each pod 108(1)/(2) also includes zero or more persistent volume claims (PVCs) 120(1)/(2), which are Kubernetes objects that are defined in the pod's specification and represent storage abstractions requested by the pod owner for use by its containers. For example, in certain embodiments each PVC 120(1)/(2) includes a capacity field indicating the desired size of the PVC and an accessMode field indicating the desired access mode for the PVC (e.g., ReadOnly (RO), ReadWriteOnce (RWO), ReadWriteMany (RWM), etc.).

When a new PVC is defined/created in a container cluster, the PVC is bound to a persistent volume in the cluster that matches the PVC's requested capacity and access mode. A persistent volume is a Kubernetes object that maps to a particular storage region/volume in the cluster's storage backend and includes details for accessing that storage region/volume (e.g., region/volume identifier (ID), etc.). Examples of such persistent volumes are shown via reference numerals 122(1) and 122(2) in container clusters 102(1) and 102(2). Once bound to a persistent volume, the pod owning the PVC can mount that persistent volume as a storage device, thereby enabling the workload embodied by the pod to read and write persistent data to/from the persistent volume's underlying storage region/volume.

As noted in the Background section, it is occasionally useful for a user to migrate a workload between two container clusters, such as from source container cluster 102(1) to destination container cluster 102(2) of FIG. 1. If the workload is stateful in nature (i.e., it makes use of one or more PVCs and corresponding persistent volumes), this migration requires, among other things, transferring the data contents of the workload's persistent volumes from storage backend 104(1) of source container cluster 102(1) to storage backend 104(2) of destination container cluster 102(2). However, existing workload migration techniques generally rely on a backup-and-restore approach via an intermediary repository that makes the transfer of persistent volume data insecure, slow, and relatively expensive to carry out.

Figure 2:
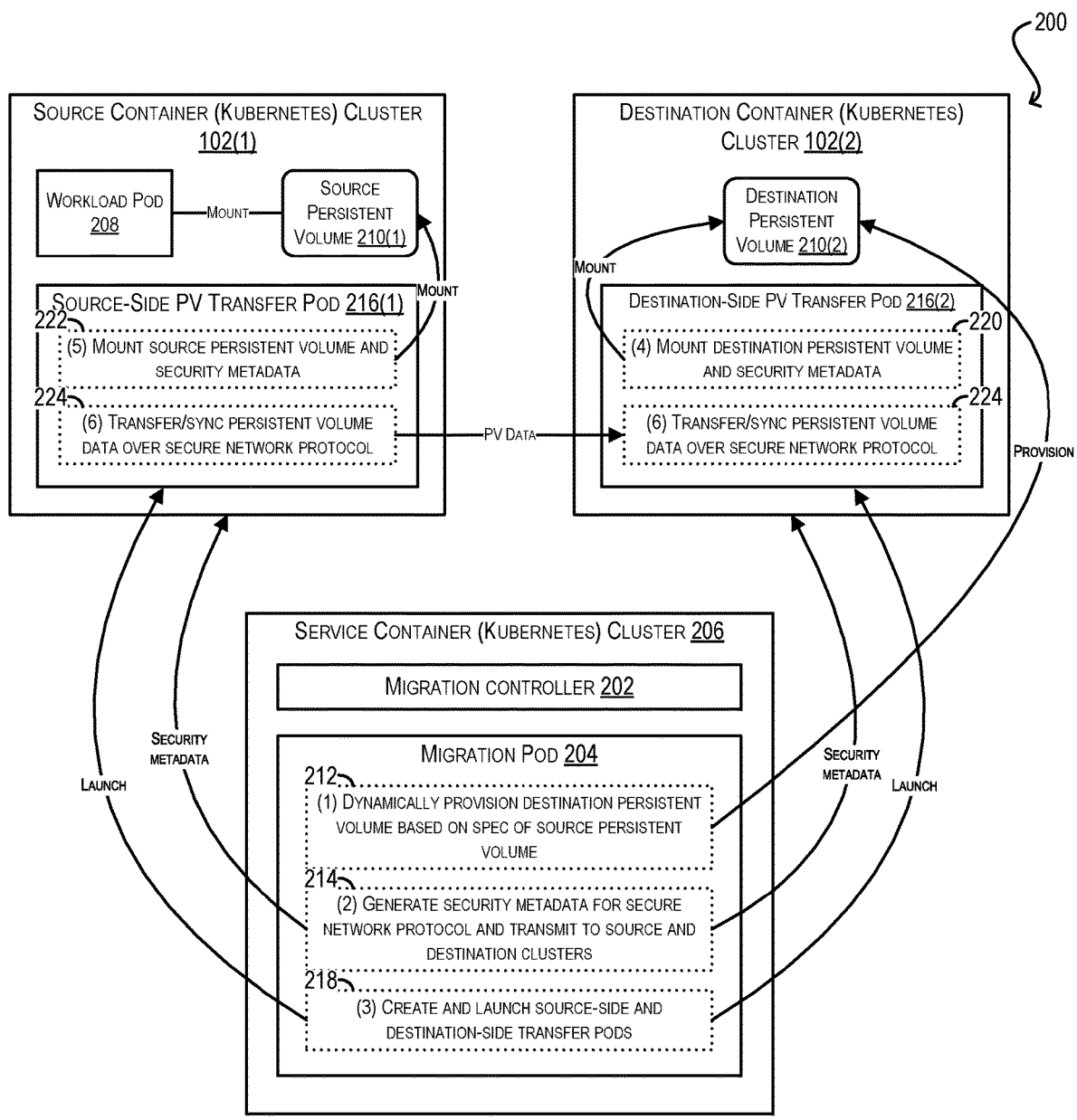
FIG. 2 depicts a version of the operating environment of FIG. 1 according to certain embodiments.

To address these and other problems, FIG. 2 depicts an enhanced version 200 of operating environment 100 that includes a novel migration controller 202 and migration process (i.e., pod) 204 running on a third (i.e., service) container cluster 206 according to certain embodiments. Generally speaking, migration controller 202 is configured to create (via, e.g., a corresponding Kubernetes Job) migration pod 204 for the purpose of migrating a stateful workload embodied by a pod 208 with a mounted source persistent volume 210(1) from source container cluster 102(1) to destination container cluster 102(2). Although migration pod 204 is specifically shown as being created and run on service container cluster 206, in alternative embodiments migration pod 204 may be created and run on either source container cluster 102(1) or destination container cluster 102(2).

As depicted in FIG. 2, upon being launched, migration pod 204 can dynamically provision a destination persistent volume 210(2) in destination container cluster 102(2) (which points to a storage region/volume on storage backend 104(2)) that is identical or largely similar to source persistent volume 210(1) (step (1); reference numeral 212). In one set of embodiments, migration pod 204 can perform this dynamic provisioning by retrieving the set of specification parameter values (e.g., capacity, access mode, etc.) found in the PVC bound to source persistent volume 210(1) and applying those same specification parameter values, to the extent possible, to destination persistent volume 210(2).

Migration pod 204 can further generate security metadata for enabling secure network communication between container clusters 102(1) and 102(2) and transmit appropriate portions of the security metadata to each cluster respectively (step (2); reference numeral 214). Migration pod 204 can then create and initiate execution of (i.e., launch) a destination-side PV transfer process (i.e., PV transfer pod) 216(2) on destination container cluster 102(2) and a corresponding source-side PV transfer process (i.e., PV transfer pod) 216(1) on source container cluster 102(1) (step (3); reference numeral 218).

In response to being launched, destination-side PV transfer pod 216(2) can mount destination persistent volume 210(2) and the security metadata transmitted by migration pod 204 to destination container cluster 102(2) (step (4); reference numeral 220). Similarly, source-side PV transfer pod 216(1) can mount source persistent volume 210(1) and the security metadata transmitted by migration pod 204 to source container cluster 102(1) (step (5); reference numeral 222). Finally, at step (6) (reference numeral 224), source-side and destination-side PV transfer pods 216(1) and 216(2)

can carry out a data transfer/synchronization process for securely transferring the data contents of source persistent volume 210(1) (backed by storage backend 104(1) of source container cluster 102(1)) to destination persistent volume 210(2) (backed by storage backend 104(2) of destination container cluster 102(2)), using the security metadata mounted at steps (4) and (5). PV transfer pods 216(1) and 216(2) can use any data synchronization tool and any secure network protocol known in the art to carry out this process, such as Rsync and SSH.

With the general approach shown in FIG. 2 and described above, a number of advantages are achieved over existing backup-and-restore solutions. First, because migration pod 204 launches PV transfer pods 216(1) and 216(2) on-demand at the time of workload migration (and can delete/remove these PV transfer pods once the migration is complete), there is no need to maintain long-lived, privileged backup-and-restore pods in the source or destination container clusters that are vulnerable to attacks. This, along with the use of a secure network protocol between PV transfer pods 216(1) and 216(2), results in significantly increased security.

Second, because persistent volume data is transferred directly between source and destination container clusters 102(1) and 102(2) rather than via an intermediary repository, migration times and costs will generally be reduced.

Third, this approach removes the intermediary repository as a scalability bottleneck and thus allow many workload migrations to be executed concurrently across different pairs of source and destination container clusters.

Fourth, in some embodiments PV transfer pods 216(1) and 216(2) can perform the data transfer/synchronization of step (6) using a two-stage approach that first synchronizes data from source persistent volume 210(1) to destination persistent volume 210(2) on a repeated basis until the amount of time needed to transfer the remaining difference (i.e., delta) in data between the two volumes falls below a user-defined threshold. Once this condition is met, the workload can be taken offline in source container cluster 102(1) and migration pod 204 can launch a second source-side transfer pod to transfer the remaining delta data in source persistent volume 210(1) to destination persistent volume 210(2). This two stage approach, which is detailed in section (3) below, advantageously minimizes the workload's downtime while ensuring that the migrated data in destination persistent volume 210(2) will be consistent with source persistent volume 210(1) at the end of the migration.

It should be appreciated that FIGS. 1 and 2 are illustrative and not intended to limit embodiments of the present disclosure. For example, although these figures depict a particular arrangement of entities and components, other arrangements are possible (e.g., the functionality attributed to a particular entity/component may be split into multiple entities/components, entities/components may be combined, etc.). Further, the various entities/components shown may include subcomponents and/or functions that are not specifically described. One of ordinary skill in the art will recognize other variations, modifications, and alternatives.

3. Migration Workflow

Figure 3:
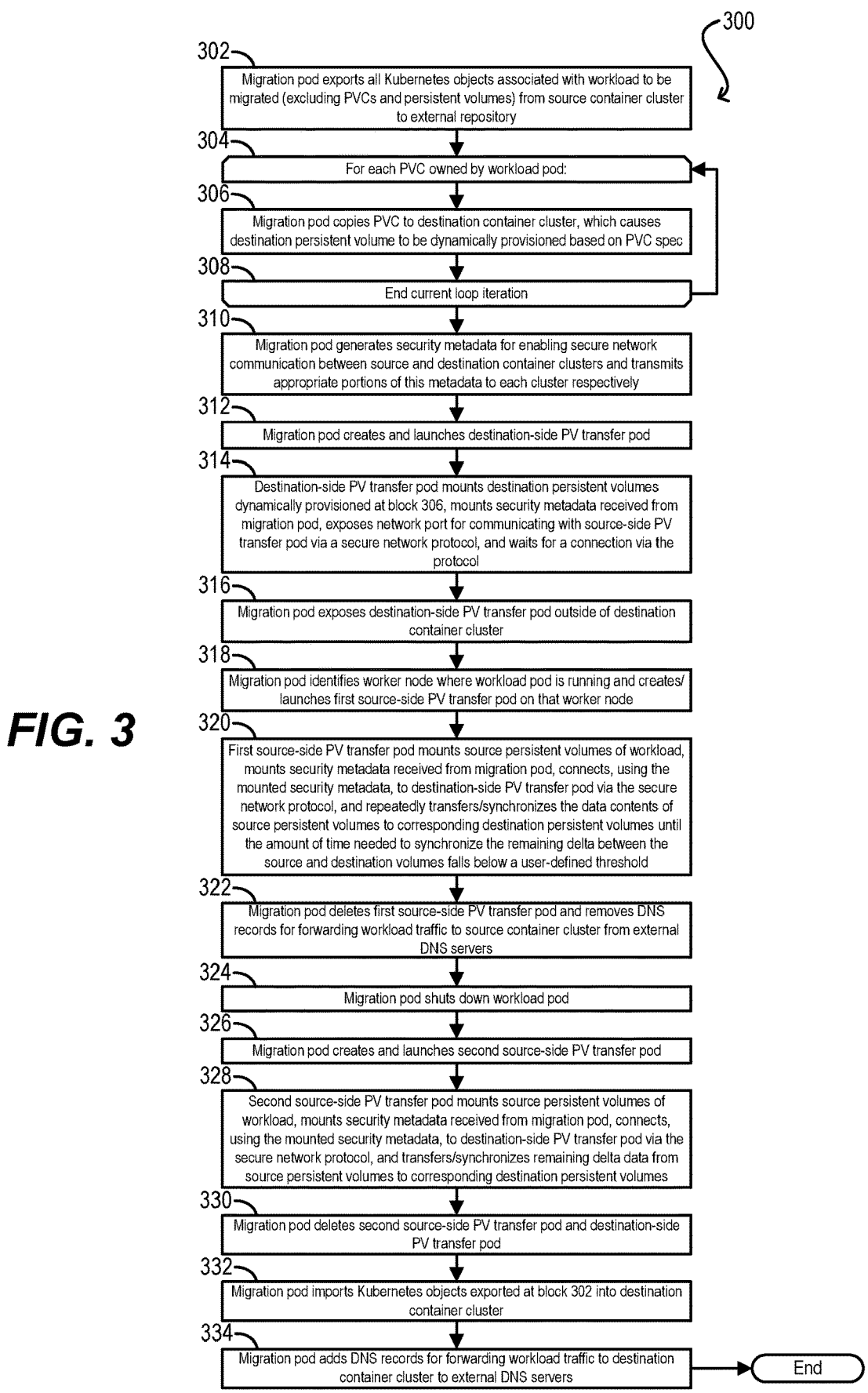
FIG. 3 depicts a workload migration workflow according to certain embodiments.

FIG. 3 depicts a workflow 300 that provides additional details regarding the processing that may be performed by migration pod 204 and PV transfer pods 216(1) and 216(2) of FIG. 2 for migrating a stateful workload from source container cluster 102(1) to destination container cluster 102(2) according to certain embodiments. Workflow 300 assumes that appropriate container images have been built that include all of the program code and dependencies needed to carry out the functions of PV transfer pods 216(1) and 216(2) and these container images are available to clusters 102(1) and 102(2) respectively. Workflow 300 also assumes that migration pod 204 implements the two-stage approach mentioned previously for persistent volume data synchronization and thus source-side PV transfer pod 216(1) is referred to as the "first" source-side PV transfer pod (to distinguish it from the "second" source-side PV transfer pod that is launched during the second stage of the data synchronization process).

Starting with block 302, migration pod 204 can export all of the Kubernetes objects that are applicable to the workload to be migrated, excluding persistent volumes and PVCs, from etcd database 114(1) of source container cluster 102(1) to a temporary storage location (e.g., an external repository). In scenarios where manifests for these Kubernetes objects are already backed up in an external repository such as git, this step can be omitted.

At block 304, migration pod 204 can enter a loop for each PVC owned by the workload's pod. Within this loop, migration pod 204 can copy the PVC to destination cluster 102(2), which causes a destination-side Kubernetes persistent volume controller (in conjunction with a destination-side storage driver) to dynamically provision (i.e., create) a new destination persistent volume in destination container cluster 102(2) that is identical (or similar) in specification to the source persistent volume (block 306). This, in turn, will cause a corresponding storage region/volume to be allocated in storage backend 104(2) and mapped to the newly provisioned destination persistent volume. As mentioned previously, the dynamic provisioning at block 306 can involve applying the PVC's specification parameter values (e.g., capacity, access mode, etc.) to the destination persistent volume, thereby rendering it identical the source persistent volume. If one or more PVC specification parameter values, such as storage class name, cannot be applied to the destination persistent volume as-is, an alternative value can be chosen. Upon provisioning the destination persistent volume and reaching the end of the current loop iteration (block 308), migration pod 204 can repeat blocks 304-308 until all of the workload pod's PVCs have been processed.

At block 310, migration pod 204 can generate security metadata for enabling secure network communication between source and destination container clusters 102(1) and 102(2) and can transmit appropriate portions of this security metadata to clusters 102(1) and 102(2) respectively. For example, in the scenario where the PV transfer pods of clusters 102(1) and 102(2) will communicate via SSH, migration pod 204 can generate a cryptographic public/private key pair, transmit the public key to destination container cluster 102(2), and transmit the private key to source container cluster 102(1). In response, clusters 102(1) and 102(2) can create Kubernetes secrets for securely storing their received keys in their respective etcd databases.

At block 312, migration pod 204 can create and launch (via, e.g., a Kubernetes job) a destination-side PV transfer pod (e.g., PV transfer pod 216(2) of FIG. 2) in destination container cluster 102(1). In response, the destination-side PV transfer pod can mount each of the destination persistent volumes provisioned at block 306, mount the destination-side security metadata transmitted by migration pod 204 at block 310, expose a network port (e.g., port 22) for communicating with the source-side PV transfer pod via a secure network protocol (e.g., SSH), and wait for a client connection request via that protocol (block 314).

Once the destination-side PV transfer pod is running, migration pod 204 can expose it to entities outside of destination container cluster 102(2) (block 316). For example, in one set of embodiments migration pod 204 can create a Kubernetes service load balancer in destination container cluster 102(2) that serves traffic to the network port exposed by the destination-side PV transfer pod at block 314 (e.g., SSH port 22).

Migration pod 204 can then identify the worker node of source container cluster 102(1) where the workload pod is currently running and create/launch (via, e.g., a Kubernetes job) a first source-side PV transfer pod (e.g., PV transfer pod 216(1) of FIG. 2) on that worker node (block 318). In response, the first source-side PV transfer pod can mount each of the source persistent volumes used by (i.e., bound to PVCs of) the workload, mount the source-side security metadata transmitted by migration pod 204 at block 310, connect, using the mounted security metadata, to the destination-side PV transfer pod via the secure network protocol, and repeatedly transfer/synchronize the data contents of the source persistent volumes to the corresponding destination persistent volumes over the secure network protocol until the amount of time needed to synchronize the remaining differences between the source and destination persistent volumes falls below a user-defined threshold (block 320).

Figure 4:
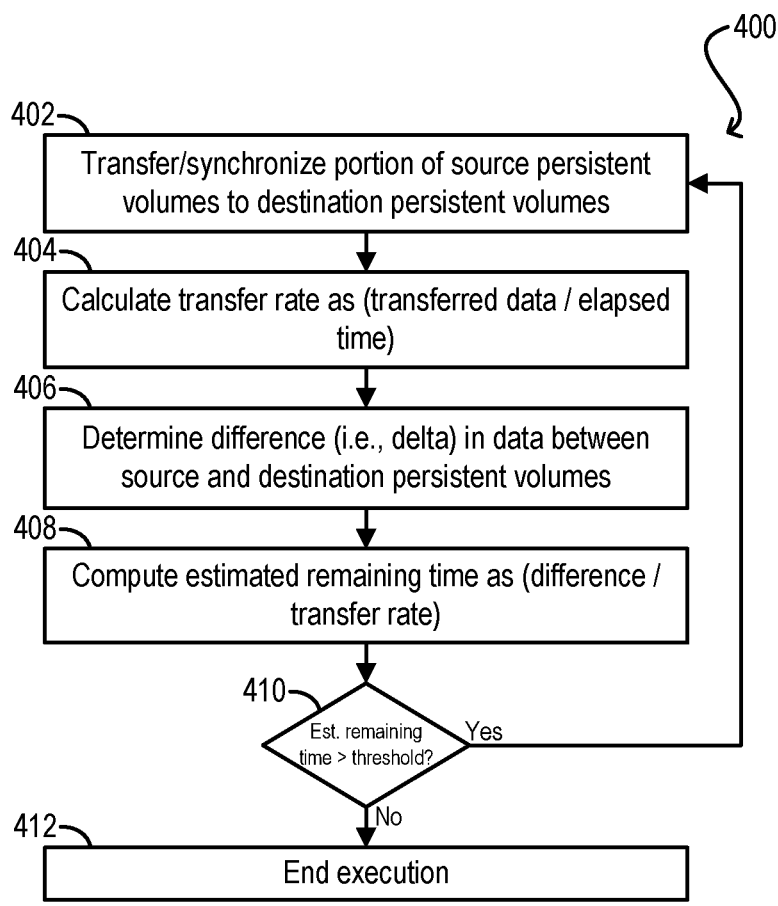
FIG. 4 depicts a persistent volume transfer pod workflow according to certain embodiments.

By way of example, FIG. 4 depicts a subroutine 400 that can be executed by the first source-side PV transfer pod for carrying out the data synchronization described at block 320 according to certain embodiments. At block 402, the first source-side PV transfer pod can transfer/synchronize some portion of the source persistent volumes to the destination persistent volumes. The first source-side PV transfer pod can further calculate the current transfer rate as the amount of transferred data divided by the amount of elapsed time (block 404), determine a difference (i.e., delta) in data between the source and destination persistent volumes (block 406), and calculate an estimated remaining time for the synchronization process by dividing the difference by the transfer rate (block 408).

If the estimated remaining time is greater than the user-defined threshold (which can be considered the desired upper limit on the downtime for the workload) (block 410), the first source-side PV transfer pod can return to block 402.

However, if the estimated remaining time is less than or equal to the user-defined threshold, the first source-side PV transfer pod can end its execution (block 412) and subroutine 400 can end.

Returning now to workflow 300, once the first source-side PV transfer pod has completed its execution, migration pod 204 can delete that pod from its worker node and remove, from all external Domain Name Service (DNS) servers, DNS records that pertain to Kubernetes ingress and/or service load balancers of source container cluster 102(1) (thereby preventing future workload request traffic from reaching the source cluster) (block 322). In addition, migration pod 204 can shut down the workload pod by, e.g., setting the replicas field of the workload's Kubernetes object to zero (block 324).

Migration pod 204 can thereafter create and launch (via, e.g., another Kubernetes job) a second source-side PV transfer pod (block 326). In response, this second source-side PV transfer pod can mount each of the source persistent volumes used by the workload, mount the source-side security metadata transmitted by migration pod 204 at block 310, connect, using the mounted security metadata, to the destination-side PV transfer pod via the secure network protocol, and transfer/synchronize the remaining delta data in the source persistent volumes to the corresponding destination persistent volumes over the secure network protocol (block 328), thereby completing the synchronization process.

Finally, at blocks 330-334, migration pod 204 can delete the second source-side PV transfer pod in source container cluster 102(1) and the destination-side PV transfer pod in destination container cluster 102(2), import the Kubernetes objects exported at block 302 into etcd database 114(2) of destination container cluster 102(2), and add, to external DNS servers, appropriate DNS records for forwarding workload traffic to the Kubernetes ingresses and/or service load balancers of destination container cluster 102(2). Upon conclusion of these steps, the workload migration is complete and workflow 300 can end.

It should be appreciated that workflow 300 is illustrative and various modifications are possible. For example, in scenarios where the workload to be migrated only has unmounted persistent volumes (i.e., persistent volumes that are not actively being used by the workload), migration pod 204 can skip execution of the first source-side transfer pod and instead only run the second source-side PV transfer pod. One of ordinary skill in the art will recognize other variations, modifications, and alternatives.

4. Migration Rollback Workflow

Figure 5:
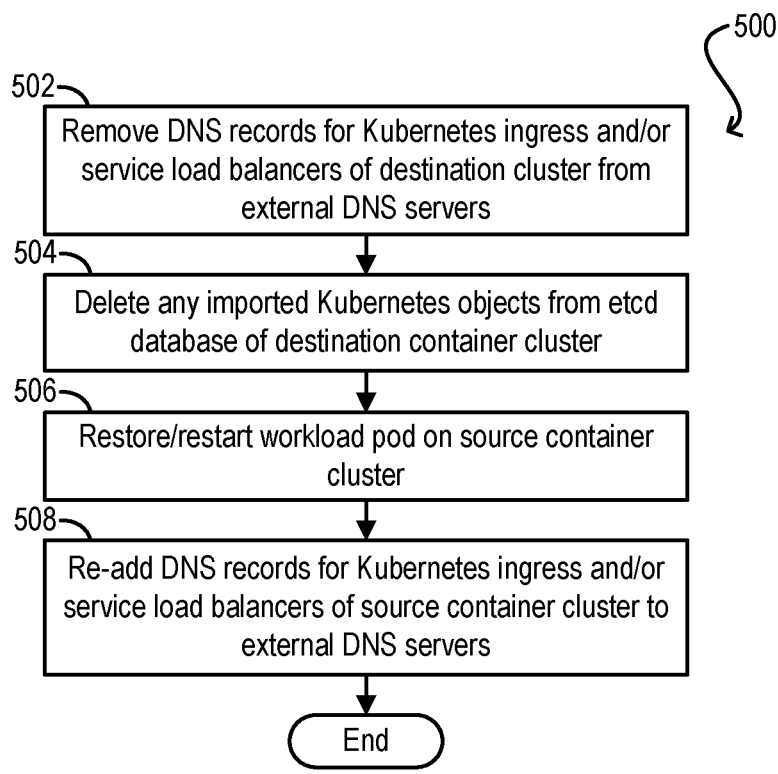
FIG. 5 depicts a migration rollback workflow according to certain embodiments.

FIG. 5 depicts a workflow 500 that may be executed by migration pod 204 of FIG. 2 (or a different pod created by migration controller 202) for rolling back a workflow migration that was initiated via workflow 300 of FIG. 3. This may be needed if, for example, an error causes the migration process to crash or if a problem is found in destination container cluster 102(2).

Starting with block 502, migration pod 204 can remove the DNS records for the Kubernetes ingress and/or service load balancers of destination container cluster 102(2) from external DNS servers (if added per block 334 of workflow 300). In addition, migration pod 204 can delete any imported Kubernetes objects in etcd database 114(2) of the destination cluster (block 504).

At block 506, migration pod 204 can restore/restart the workload pod on source container cluster 102(2) by resetting the workload object's replicas field to its original value. This will cause the workload pod to re-mount its source-side PVCs/persistent volumes.

Finally, at block 508, migration pod 204 can re-add DNS records for the Kubernetes ingress and/or service load balancers of source container cluster 102(1) to the external DNS servers (thereby causing workload request traffic to once again flow to the source cluster) and workflow 500 can end.

5. Securely and Efficiently Migrating Objects

Workflow 300 of FIG. 3—which focuses on improving the migration of persistent volume data—generally assumes that the Kubernetes objects of the workload being migrated (excluding its PVCs and persistent volumes) will be exported from source container cluster 102(1) to an external repository (per block 302) and imported to destination container cluster 102(2) from the external repository (per block 332) using existing backup-and-restore tools. However, using a backup-and-restore approach for migrating these objects leads to many of the same problems discussed with respect to persistent volumes. For example, some objects (such as Kubernetes secrets) contain confidential/sensitive data; accordingly, users may have security concerns about temporarily moving such data to an external repository. Further, current backup-and-restore tools generally need to be deployed as long-lived pods in the source and destination container clusters and are designed to process backup/restore tasks in sequence (rather than in parallel), resulting in usability, efficiency, and scalability issues.

Figure 6:
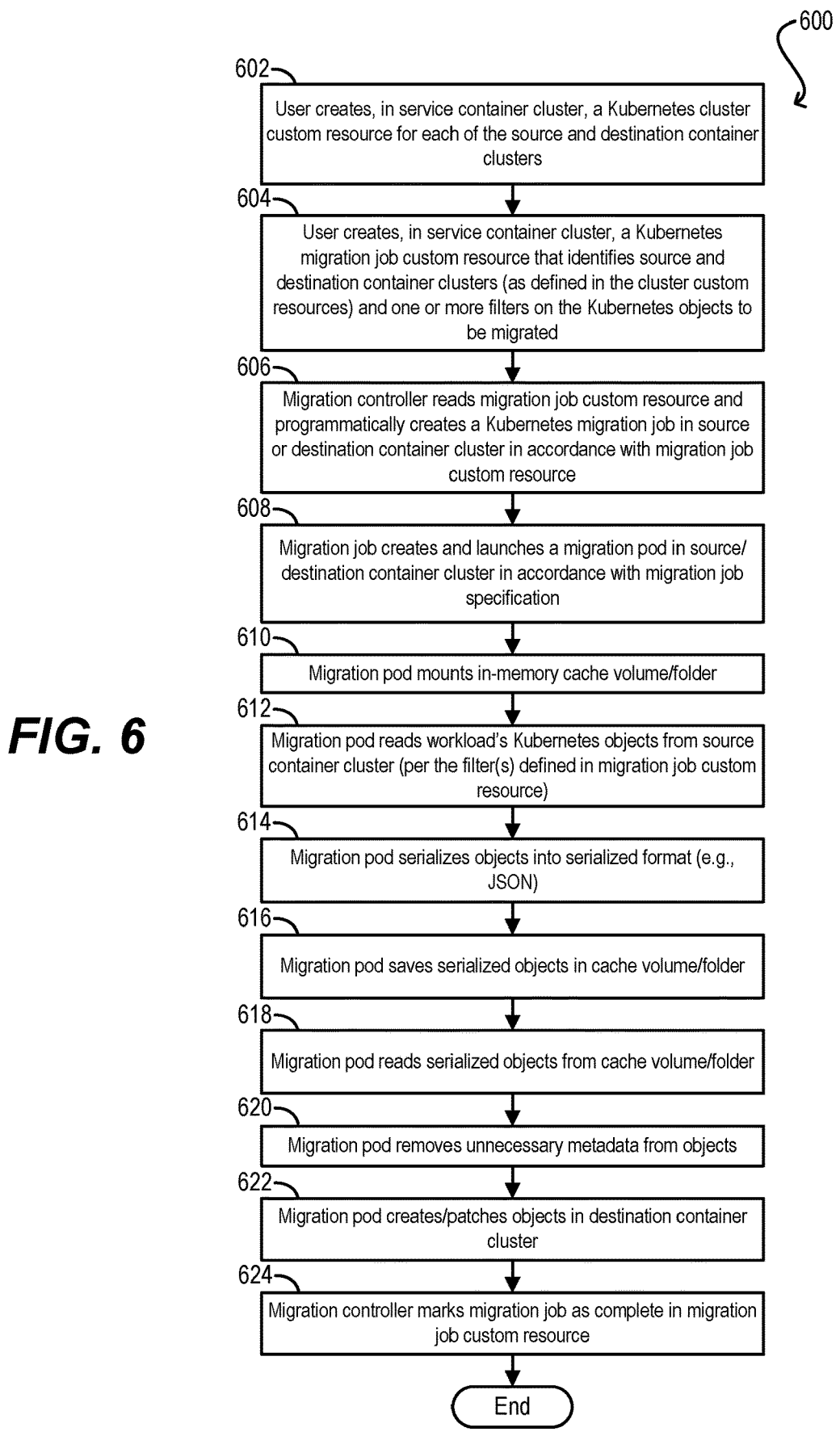
FIG. 6 depicts a workload object migration workflow according to certain embodiments.

To address the foregoing problems, FIG. 6 depicts a workflow 600 that can be executed by migration pod 204 of FIG. 2 for securely and efficiently migrating the Kubernetes objects of a workload (excluding the workload's PVCs and persistent volumes) from source container cluster 102(1) to destination container cluster 102(2) according to certain embodiments.

With the processing shown in workflow 600, migration pod 204 can read the workload's objects from source container cluster 102(1), transform them into a serialized format, temporarily store them in an in-memory data structure/folder, and then directly apply/create them in destination container cluster 102(2), without requiring an external repository. This results in greater security (due the elimination of the external repository), efficiency (due to the object transfer pod being launched on-demand, rather than being long-lived), and scalability (due to the ability to run multiple migration pods 204 in parallel to handle concurrent workload migrations). In certain embodiments, migration pod 204 can also carry out the other workload migration tasks described in workflow 300 of FIG. 3, such as migrating PVCs and persistent volumes from the source to destination container cluster.

Starting with block 602 of workflow 600, a user (e.g., administrator) can create, in service container cluster 206, a Kubernetes cluster custom resource object for source container cluster 102(1) and destination container cluster 102(2) respectively, where each cluster custom resource object includes information useable for accessing its cluster (such as, e.g., the uniform resource locator (URL) of the cluster's API server, certificate authority data, and a service account token). In addition, the user can create a Kubernetes migration job custom resource object that identifies clusters 102(1) and 102(2) as the source and destination clusters of the workload migration (as defined in the cluster custom resources) and includes one or more filters on the Kubernetes objects to be migrated (block 604). For example, these filters can identify Kubernetes namespaces that are associated with the workload and can exclude the workload's PVCs and persistent volumes.

At block 606, migration controller 202 can read the migration job custom resource and programmatically create a Kubernetes migration job in either source container cluster 102(1) or destination container cluster 102(2). This migration job can specify, among other things, a container image for migrating the workload's Kubernetes objects, a specific command to be run for carrying out the object migration, and the mount path for a temporary in-memory (i.e., cache) volume/folder.

Upon being created, the migration job can create and launch migration pod 204 in the source/destination container cluster in accordance with the job specification (block 608). In response, the main process of migration pod 204 can mount the cache volume/folder (block 610), read the workload's Kubernetes objects from etcd database 114(1) of source container cluster 102(1) (per the filter(s) defined in the migration job custom resource) (block 612), serialize the objects into a serialized format such as JSON (JavaScript Object Notation) (block 614), and save the serialized objects in the cache volume/folder (block 616). In certain embodiments, as part of reading the workload's Kubernetes objects at block 612, the migration pod can also read cluster-scope objects on which the workload's objects depend. For example, if the source service account is bound to a ClusterRoleBinding object, the migration pod can also read this ClusterRoleBinding for migration purposes.

Once the workload's objects have been saved in the cache volume/folder, migration pod 204 can perform any other workload migration tasks that may need to be carried out, such as the persistent volume migration performed via blocks 304-330 of workflow 300. Then, at blocks 618-622, migration pod 204 can read the serialized objects from the cache volume/folder, remove unnecessary metadata (e.g., UUID) from the objects, and create (or patch) them in etcd database 114(2) of destination container cluster 102(2), thereby restoring those objects in the destination cluster. Although not shown, migration pod 204 can also add DNS records to external DNS servers for forwarding the workload's traffic to destination container cluster 102(2), per block 334 of workflow 300.

Finally, once migration pod 204 has completed its execution, migration controller 202 can mark it as complete in the migration job custom resource maintained in service container cluster 206 (block 624) and workflow 600 can end.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O.

Further, certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method for migrating a stateful workload from a source container cluster to a destination container cluster, wherein the source container cluster is connected to a first storage backend, wherein the destination container cluster is connected to a second storage backend distinct from the first storage backend, and wherein the stateful workload makes use of a source persistent volume in the source container cluster that maps to a storage region or volume in the first storage backend, the method comprising:

provisioning, by a migration process in communication with the source and destination container clusters, a destination persistent volume in the destination container cluster that maps to a storage region or volume in the second storage backend, the destination persistent volume being based on the source persistent volume;

launching, by the migration process, a destination-side transfer process in the destination container cluster; and launching, by the migration process, a source-side transfer process in the source container cluster, wherein upon being launched, the source-side and destination-side transfer processes synchronize, over a secure network protocol, data contents of the source persistent volume to the destination persistent volume;

wherein prior to launching the source-side and destination-side transfer processes, the method further comprising:

generating, by the migration process, security metadata for enabling secure network communication between the source and destination container clusters; and transmitting, by the migration process, at least a portion of the security metadata to the source and destination container clusters respectively:

wherein upon being launched, the destination-side transfer process:

mounts the destination persistent volume;

mounts the portion of the security metadata transmitted by the migration process to the destination container cluster;

exposes a network port from communicating with the source-side transfer process via the secure network protocol; and waits for a connection from the source-side transfer process via the secure network protocol:

wherein upon being launched, the source-side transfer process:

mounts the source persistent volume;

mounts the portion of the security metadata transmitted by the migration process to the source container cluster:

connects, using the mounted security metadata, to the destination-side transfer process via the secure network protocol; and repeatedly synchronizes the data contents of the source persistent volume to the destination persistent volume until an amount of time needed to synchronize a remaining difference in data between the source and destination persistent volumes falls below a threshold:

wherein, upon completion of execution of the source-side transfer process:

the method further comprising:

deleting the source-side transfer process;

removing, from one or more external Domain Name Service (DNS) servers, DNS records for forwarding workload traffic to the source container cluster;

shutting down the workload; and launching another source-side transfer process in the source container cluster.

2. The method of claim 1 wherein the provisioning comprises:

determining, from a specification of a persistent volume claim (PVC) bound to the source persistent volume in the source container cluster, a capacity and an access mode of the source persistent volume; and provisioning the destination persistent volume to have the determined capacity and the determined access mode.

3. The method of claim 1 wherein said another source-side transfer process synchronizes the remaining difference in data from the source persistent volume to the destination persistent volume.

4. A non-transitory computer readable storage medium having stored thereon program code executable by a computer system, the program code embodying a method for migrating a stateful workload from a source container cluster to a destination container cluster, wherein the source container cluster is connected to a first storage backend, wherein the destination container cluster is connected to a second storage backend distinct from the first storage backend, and wherein the stateful workload makes use of a source persistent volume in the source container cluster that maps to a storage region or volume in the first storage backend, the method comprising:

provisioning a destination persistent volume in the destination container cluster that maps to a storage region or volume in the second storage backend, the destination persistent volume being based on the source persistent volume;

launching a destination-side transfer process in the destination container cluster; and launching a source-side transfer process in the source container cluster, wherein upon being launched, the source-side and destination-side transfer processes synchronize, over a secure network protocol, data contents of the source persistent volume to the destination persistent volume;

wherein the method further comprises, prior to launching the source-side and destination-side transfer processes:

generating security metadata for enabling secure network communication between the source and destination container clusters; and transmitting at least a portion of the security metadata to the source and destination container clusters respectively:

wherein upon being launched, the destination-side transfer process:

mounts the destination persistent volume;

mounts the portion of the security metadata transmitted to the destination container cluster;

exposes a network port from communicating with the source-side transfer process via the secure network protocol; and waits for a connection from the source-side transfer process via the secure network protocol;

wherein upon being launched. the source-side transfer process:

mounts the source persistent volume;

mounts the portion of the security metadata transmitted to the source container cluster:

connects, using the mounted security metadata, to the destination-side transfer process via the secure network protocol; and repeatedly synchronizes the data contents of the source persistent volume to the destination persistent volume until an amount of time needed to synchronize a remaining difference in data between the source and destination persistent volumes falls below a threshold:

wherein the method further comprises, upon completion of execution of the source-side transfer process:

deleting the source-side transfer process;

removing, from one or more external Domain Name Service (DNS) servers, DNS records for forwarding workload traffic to the source container cluster;

shutting down the workload; and launching another source-side transfer process in the source container cluster.

5. The non-transitory computer readable storage medium of claim 4 wherein the provisioning comprises:

determining, from a specification of a persistent volume claim (PVC) bound to the source persistent volume in the source container cluster, a capacity and an access mode of the source persistent volume; and provisioning the destination persistent volume to have the determined capacity and the determined access mode.

6. The non-transitory computer readable storage medium of claim 4 wherein said another source-side transfer process synchronizes the remaining difference in data from the source persistent volume to the destination persistent volume.

7. A computer system comprising:

a processor; and a non-transitory computer readable medium having stored thereon program code that causes the processor to migrate a stateful workload from a source container cluster to a destination container cluster, wherein the source container cluster is connected to a first storage backend, wherein the destination container cluster is connected to a second storage backend distinct from the first storage backend, and wherein the stateful workload makes use of a source persistent volume in the source container cluster that maps to a storage region or volume in the first storage backend, the migrating comprising:

provisioning a destination persistent volume in the destination container cluster that maps to a storage region or volume in the second storage backend, the destination persistent volume being based on the source persistent volume;

launching a destination-side transfer process in the destination container cluster; and launching a source-side transfer process in the source container cluster, wherein upon being launched, the source-side and destination-side transfer processes synchronize, over a secure network protocol, data contents of the source persistent volume to the destination persistent volume;

wherein the migrating further comprises, prior to launching the source-side and destination-side transfer processes:
generating security metadata for enabling secure network communication between the source and destination container clusters; and
transmitting at least a portion of the security metadata to the source and destination container clusters respectively:
wherein upon being launched, the destination-side transfer process:
mounts the destination persistent volume;
mounts the portion of the security metadata transmitted to the destination container cluster:
exposes a network port from communicating with the source-side transfer process via the secure network protocol; and
waits for a connection from the source-side transfer process via the secure network protocol;
wherein upon being launched, the source-side transfer process:
mounts the source persistent volume;
mounts the portion of the security metadata transmitted to the source container cluster:
connects, using the mounted security metadata, to the destination-side transfer process via the secure network protocol; and
repeatedly synchronizes the data contents of the source persistent volume to the destination persistent volume until an amount of time needed to synchronize a remaining difference in data between the source and destination persistent volumes falls below a threshold;
wherein the migrating further comprises, upon completion of execution of the source-side transfer process:
deleting the source-side transfer process:
removing. from one or more external Domain Name Service (DNS) servers, DNS records for forwarding workload traffic to the source container cluster;
shutting down the workload; and
launching another source-side transfer process in the source container cluster.

8. The computer system of claim 7 wherein the provisioning comprises:
determining, from a specification of a persistent volume claim (PVC) bound to the source persistent volume in the source container cluster, a capacity and an access mode of the source persistent volume; and
provisioning the destination persistent volume to have the determined capacity and the determined access mode.

9. The computer system of claim 7 wherein said another source-side transfer process synchronizes the remaining difference in data from the source persistent volume to the destination persistent volume.

* * * * *